US009747463B2

(12) United States Patent
Pasumarthi et al.

(10) Patent No.: US 9,747,463 B2
(45) Date of Patent: Aug. 29, 2017

(54) SECURING ACCESS TO BUSINESS INFORMATION

(71) Applicants: Suresh Pasumarthi, Bangalore (IN); Vinay Sheel, Bangalore (IN)

(72) Inventors: Suresh Pasumarthi, Bangalore (IN); Vinay Sheel, Bangalore (IN)

(73) Assignee: SAP SE, Walldorf (DE)

( * ) Notice: Subject to any disclaimer, the term of this patent is extended or adjusted under 35 U.S.C. 154(b) by 63 days.

(21) Appl. No.: 14/093,419

(22) Filed: Nov. 30, 2013

(65) Prior Publication Data

US 2015/0154417 A1   Jun. 4, 2015

(51) Int. Cl.
| G06F 7/04 | (2006.01) |
| --- | --- |
| H04L 29/06 | (2006.01) |
| H04L 9/32 | (2006.01) |
| G06F 21/00 | (2013.01) |
| G06F 21/62 | (2013.01) |
| G06Q 10/06 | (2012.01) |
| H04W 4/02 | (2009.01) |

(52) U.S. Cl.
CPC ......... *G06F 21/6218* (2013.01); *G06Q 10/06* (2013.01); *H04W 4/021* (2013.01); *G06F 2221/2111* (2013.01)

(58) Field of Classification Search
CPC ........ G06F 21/6218; G06F 2221/2111; H04W 4/021; G06Q 10/06
USPC ............ 726/30, 1, 4, 28; 713/165, 166, 168; 705/51
See application file for complete search history.

(56) References Cited

U.S. PATENT DOCUMENTS

| 6,813,501 | B2 | 11/2004 | Kinnunen et al. |
| --- | --- | --- | --- |
| 7,503,074 | B2 | 3/2009 | Dublish et al. |
| 8,223,012 | B1 | 7/2012 | Diem |
| 8,230,087 | B2 | 7/2012 | Alve |
| 8,707,023 | B2 | 4/2014 | Nagel et al. |
| 8,805,956 | B1* | 8/2014 | Yang ................. G06F 21/10 709/217 |
| 2002/0177449 | A1 | 11/2002 | McDonnell et al. |
| 2004/0068649 | A1 | 4/2004 | Haller et al. |
| 2005/0239481 | A1* | 10/2005 | Seligmann .......... H04W 4/02 455/456.2 |
| 2008/0022003 | A1 | 1/2008 | Alve |
| 2008/0046965 | A1 | 2/2008 | Wright et al. |
| 2008/0218196 | A1 | 9/2008 | Eckhart |
| 2009/0013038 | A1 | 1/2009 | Vogler et al. |
| 2011/0055890 | A1 | 3/2011 | Gaulin et al. |

(Continued)

*Primary Examiner* — Aravind Moorthy

(57) ABSTRACT

To provide a secure access to business information, restriction rules are generated and associated with metadata of the business information. The restriction rules are propagated to a device application functioning on a device. The device application monitors a geo-fencing location of the device based upon the received restriction rules. Based upon a request to access the business information triggered at the device, the restriction rules associated with a current geo-fencing location of the device and the restriction rules associated with the requested business information is determined. Based upon the restriction rules associated with the requested business information and network connectivity, the requested business information is downloaded to the device. Based upon the restriction rules associated with the current geo-fencing location of the device, an access to the downloaded business information is rendered.

19 Claims, 8 Drawing Sheets

(56) References Cited

U.S. PATENT DOCUMENTS

| | | |
|---|---|---|
| 2011/0069690 A1 | 3/2011 | Caulfield |
| 2011/0099608 A1 | 4/2011 | Queck et al. |
| 2011/0208797 A1 | 8/2011 | Kim |
| 2012/0060008 A1 | 3/2012 | Matsushima et al. |
| 2012/0216290 A1 | 8/2012 | Roy et al. |
| 2012/0246484 A1* | 9/2012 | Blaisdell et al. ............. 713/189 |
| 2013/0031598 A1 | 1/2013 | Whelan et al. |
| 2013/0047197 A1 | 2/2013 | Saroiu et al. |
| 2014/0036697 A1* | 2/2014 | Annan et al. ................. 370/252 |
| 2014/0101757 A1* | 4/2014 | Gnesda et al. .................. 726/22 |
| 2014/0150114 A1* | 5/2014 | Sinha et al. .................... 726/28 |
| 2014/0162692 A1* | 6/2014 | Li ........................... H04L 67/40 455/456.3 |
| 2015/0058749 A1* | 2/2015 | Hwu et al. .................... 715/753 |

* cited by examiner

FIG. 7

GEO-FENCED LOCATION MONITORING DEVICE APPLICATION 710

| LOCATION 715 | BUILDING WDC 01, BLOCK C, FLOOR 13 |
|---|---|
| QUERY 720 | SALES OF 2012 |

AVAILABLE REPORTS 725

SELECTED REPORT 745

SECURING ACCESS TO BUSINESS INFORMATION

1. SAMPLE TEXT HERE
2. SAMPLE TEXT HERE
3. SAMPLE TEXT HERE
4. SAMPLE TEXT HERE

| STATUS 750 | DEVICE IS INSIDE GEO-FENCED LOCATION => ACCESS TO VIEW DOCUMENT IS GRANTED => DOCUMENT VIEW RENDERED |
|---|---|

700

SECURING ACCESS TO BUSINESS INFORMATION

BACKGROUND

With the advent of the internet and portable computing devices, information can be accessed easily and quickly from anywhere. Users can access reports such as business intelligence (BI) reports from any location and at any time over various communication networks. Some reports may include sensitive enterprise information, and accessing such reports from public places is not desired. Instructing users not to open the reports is not an effective or a reliable approach for protecting sensitive data. Restricting the access of reports by securing the data with passwords may not be sufficient, considering various locations and various users present at the location. In addition, password protection is not effective because once the report is opened, all the sensitive data is exposed. With such restrictions and hindrances, these mechanisms may not allow users to complete their official BI/analysis tasks along with safeguarding the sensitive data in public places.

SUMMARY

Various embodiments of systems and methods to provide a secure access to business information are described. In one aspect, restriction rules are received at a device application functioning in a device. The restriction rules are associated with metadata of business information and the device application monitors a current geo-fencing location of the device. Further, based upon a request to access the business information triggered at the device, one or more restriction rules associated with the current geo-fencing location of the device and one or more restriction rules associated with the requested business information are determined. In another aspect, based upon the one or more restriction rules associated with the requested business information and based upon network connectivity, the requested business information is downloaded to the at least one device and based upon the one or more restriction rules associated with the current geo-fencing location of the at least one device and independent of network connectivity, access to the downloaded business information is provided.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 7 is a user interface illustrating a provision of secure access to business information, according to an embodiment.

DETAILED DESCRIPTION

Figure 1:
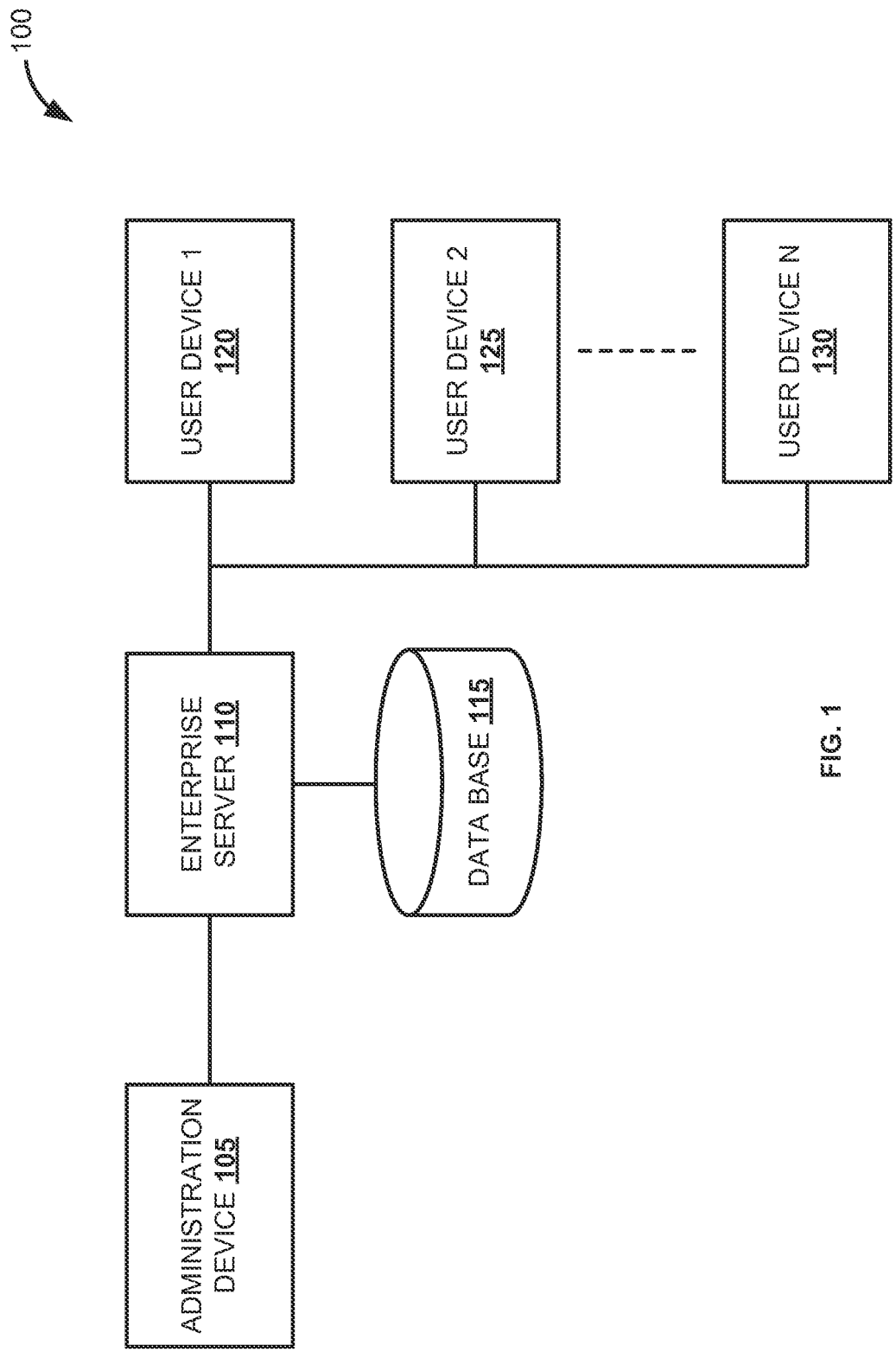
FIG. 1 is a block diagram illustrating a system to provide a secure access to business information, according to an embodiment.

Embodiments of techniques to provide a secure access to business information are described herein. In the following description, numerous specific details are set forth to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Securing business information is essential to protect access to associated confidential data. Business entities may want to secure the access to their business information by commissioning security policy. Devices used in such entities are entered into an agreement or a contract with the entities' security policy, to provide secured access to the information accessed via the devices. Business information may be residing in business documents and business reports, and access to partial or the entire business information residing in the documents/reports needs to be secured. Restriction rules and criteria may be configured and associated with the business information such that the information is accessible in secured locations to a secured set of authorized users. In an embodiment, an administrator defines the restriction rules and criteria dynamically. In another embodiment, the restriction rules and criteria are configured and stored in an associated database, and are retrieved during the process. To secure the access to such confidential data, geo-fencing capability is used along with the restriction rules. Geo-fencing is a method of defining a virtual boundary for a geographic area; and access to confidential data is confined to the defined virtual boundary. For instance, New York State may be geo-fenced as a secure location, and access to corresponding documents including business information related to New York State (e.g. New York Sales Revenue document) is permitted from New York State only. Geo-fencing capability includes defining geo-spatial co-ordinates associated with a geographical location; and access to confidential data may be confined to the defined geographical location. For instance, ground-level of building 1 may be defined as a secure geo-spatial location; and access to corresponding documents including business information related to projects executed in ground-level of building 1 is permitted.

In an embodiment, secure and unsecure regions are specified as restriction rules. Downloading and/or viewing of documents and reports in secure regions may be allowed; and downloading and/or viewing of documents and reports in unsecure regions may not be allowed. In an embodiment, downloading of documents and reports in secure regions may be allowed, but viewing of the downloaded documents may be permitted only in few specified secure regions. For instance, viewing of a document may be restricted to New York City, whereas the downloading of the document may be permitted from anywhere in the entire New York State. So, a device which is currently in Albany may be able to download the document but will not be allowed to view the downloaded document until the device enters New York City. Hence, irrespective of the device being in connection with a network (for e.g. the device being online or offline), the securities and restriction rules are applied while an attempt is made to access, download and/or view such confidential information. Downloading or access of documents and reports may be limited or absent when the device is in an unsecure region. In an embodiment, partial business information may be available in unsecure regions, and complete business information may be available in secure regions.

FIG. 1 is a block diagram illustrating a system to provide a secure access to business information, according to an embodiment. System 100 includes administration device 105, enterprise server 110, database 115 associated with enterprise server 110 and various user devices, including user device 1 120, user device 2 125 and user device N 130. To provide a secure access to business information, administration device 105 generates various restriction rules. The restriction rules generated by administration device 105 may be received as inputs from a user. The user may provide criteria based upon which administration device 105 generates the restriction rules. In an embodiment, administration device is in association with a user interface engine (not shown in FIG. 1), that is responsible to accept user inputs from an associated computer generated user interface and render the inputs to generate the restriction rules.

Enterprise server 110 is communicatively coupled to administration device 105. Enterprise server 110 associates the generated restriction rules with metadata of the business information residing in database 115. Enterprise server 110 may establish a connection between administration device 105 and user devices 120, 125 and 130, and propagate the restriction rules to the devices. Enterprise server 110 may propagate the restriction rules to user devices 1, 2 and N (120, 125 and 130 respectively). In an embodiment, devices (e.g. computing devices, hand-held devices, portable devices, etc.) that have contracted or registered to provide secure access to business information have a device application installed on the device. Once the device application functioning on the device, e.g. 120, 125 and 130, receives the propagated restriction rules, the device application determines the geo-fencing locations defined in the received restriction rules and monitors the locations associated with the rules.

Device, e.g. 120, 125 and 130, may receive a request to access business information. A user using device (1) 120 may propagate a request to access business information to the device application. Device (1) 120 may trigger the device application to request access to business information. The device application of user device (1) 120, which has been monitoring the geo-fencing location of device (1) 120, determines the restriction rules associated with a current location of the device and the restriction rules associated with the requested business information. Based upon the restriction rules associated with the requested business information and network connectivity, the device application of device (1) 120 accesses enterprise server 110 to download the requested business information residing in database 115. Based upon the current geo-fencing location of device (1) 120, an access to the downloaded business information is provided by the device application of device (1) 120.

In an embodiment, processor (not shown in FIG. 1) associated with enterprise server 110 is operable to read and execute instructions associated with a process of providing secure access to the business information. Memory elements (not shown in FIG. 1), associated with the processor may persist the instructions associated with the process.

In an embodiment, a framework may be generated to provide a secure access to the business information. The framework may represent a standalone feature that secures access to the business information on the contracted devices. This may be achieved by associating such a framework with enterprise server 110. The framework may also represent a plug-in feature where the process to provide secure access is applied on a business information system or a business information landscape. As a plug-in, the framework serves in extending existing features of the system, and providing additional means of securing information, without disrupting existing security measures.

Figure 2:
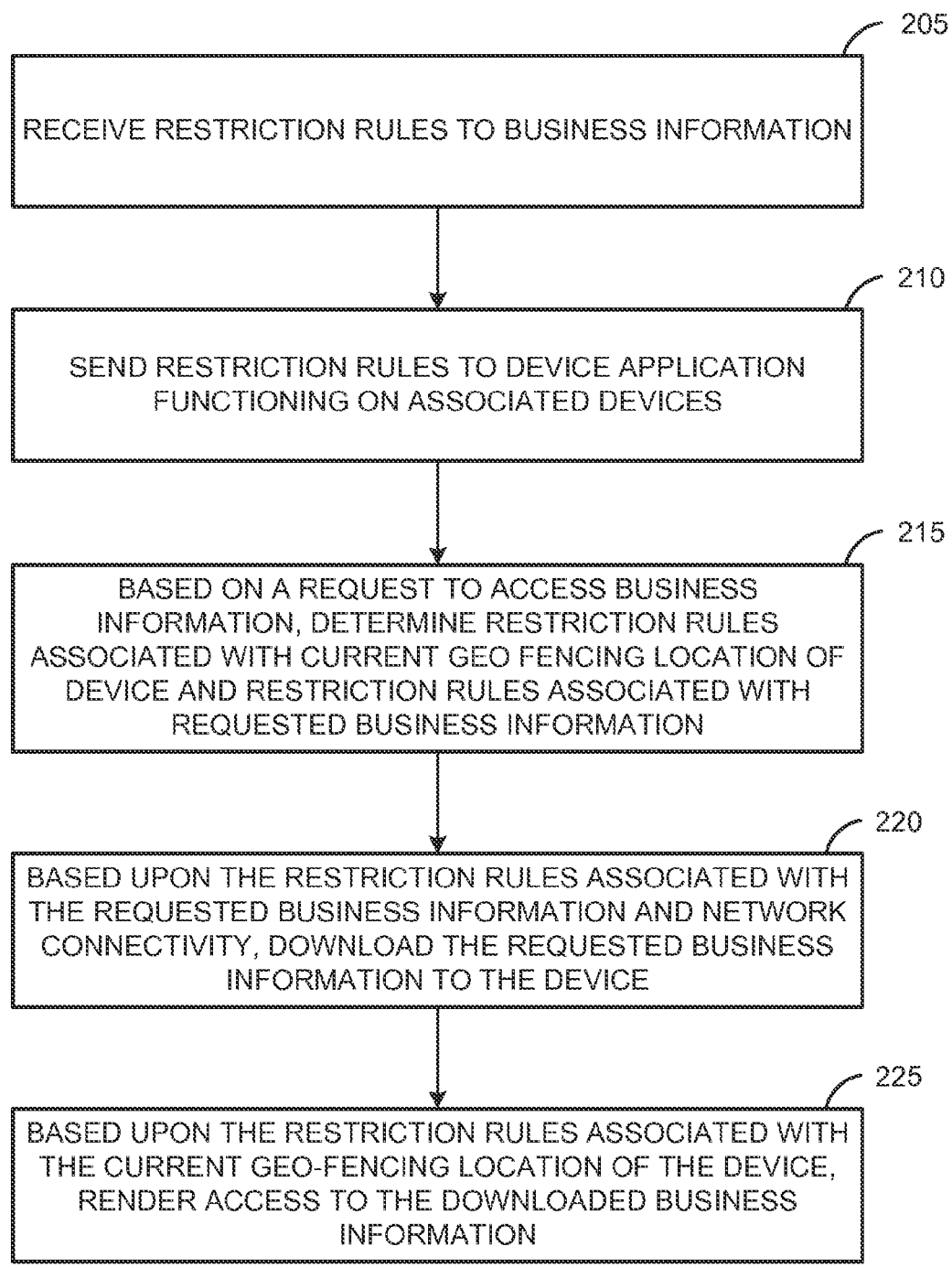
FIG. 2 is a block diagram illustrating a process to provide a secure access to business information, according to an embodiment.

FIG. 2 is a block diagram illustrating a process to provide a secure access to business information, according to an embodiment. For example, the business information may be residing in a database as records of information including documents, files, reports, graphs, tables and the like. The business information in such records may include sensitive and/or confidential information, and access to such confidential information involves security risks. To provide a secure access to business information, at 205, restriction rules to the business information are received. The restriction rules may be configured to be associated with the business information based upon content and context of the business information. For instance, if the business information in a document "A" includes customers' list, obtaining such information may provide an economical advantage to a competitor. Hence, document A cannot be accessed and/or viewed in presence of a competitor.

Restriction rules may be associated with metadata of the business information, to specify restrictions to access the business information. Associating the restriction rules with metadata includes specifying unique identifiers for the corresponding restriction rules in the metadata. This association of the restriction rules with the metadata may be executed at a document level representing an entire document, or at a document section level representing multiple sections in a document. For instance, restriction rules may be applied for an entire document or for a specific section of a document. Upon association, each restriction rule may include a unique identifier, a rule definition and a location associated with the rule. The unique identifiers corresponding to the restriction rules may be defined, and may be associated with metadata of documents containing the business information. The unique identifiers may be associated with the metadata of parts of the document or the entire document containing the business information. The unique identifiers may be also associated with the geo-fencing locations. The unique identifiers may aid in identification of connections between geo-locations, business information, network connectivity and the restriction rules associated with them. When a restriction rule is applied to the business information, the associated unique identifier, rule definition and the location is correspondingly applied to the business information. This may impact the location from where the business information is being requested, accessed and viewed.

At 210, restriction rules are propagated to device applications functioning on various devices that are contracted to provide secure access to the business information. A device application functions as a background program of the device, where the application continually monitors the location of the device. Once the device application functioning on the devices receives the propagated restriction rules, the device application determines the geo-fencing locations defined in the received restriction rules. The device application also monitors the locations associated with the rules. The propagation of the restriction rules may be initiated by the administrator as a part of a response to a login to the corresponding device or as a part of a commissioning security policy configuration. Once the restriction rules are propagated to the device applications, the device applications infers the metadata associated with the restriction rules, and monitors the location of the device accordingly.

At 215, based on a request to access business information, restriction rules associated with a current geo-fencing location of the associated device and restriction rules associated with the requested business information are determined. In an embodiment, the current location is the location at which the request to access the business information was propagated. In an embodiment, each geo-fencing location may have a unique set of associated restriction rules. For instance, a location NEW YORK CITY may have a different set of associated restriction rules from a location ALBANY. Each requested business information may have a unique set of associated restriction rules. For instance, a document including CUSTOMERS' LIST of an entity ABC may have a different set of associated restriction rules from a document including SALES REVENUE of the entity ABC.

At 220, based upon the restriction rules associated with the requested business information and network connectivity, the requested business information is downloaded to the device. The device that requested the access to the business information may be within a geo-fencing location, but the device may not be connected to an enterprise server (e.g. 110) via a network. For instance, the device may be out of range of the network; or the network connectivity of the device may not allow data transfer; etc. For example, a user of a contracted device (e.g. devices that are contracted to provide secure access to business information) may be visiting a client location that is outside network connectivity of the enterprise server. To accommodate secure access to information in such situations, the requested business information may be downloaded on to the device ahead of time, at a different geo-fencing location. However, viewing the downloaded business information may be restricted at the point of downloading.

At 225, based upon the restriction rules associated with the current geo-fencing location of the device, access to the downloaded business information is rendered. The downloading of business information and the viewing of the downloaded business information may occur at a same instance. This occurs when the request to access the business information is propagated when the device is in geo-fencing location that is permitted for access and viewing according to the restriction rules.

In an embodiment, when a user of a device, contracted to provide secure access, attempts to operate a document containing the business information, the device application functioning on the device determines the restriction rules associated with the document and applied the corresponding rules to the document. Upon applying the restriction rules, the operation, (e.g. open the document, transmit the document to another device, delete the document, edit the document, etc.), may be performed in accordance with the restriction rules.

Figure 3:
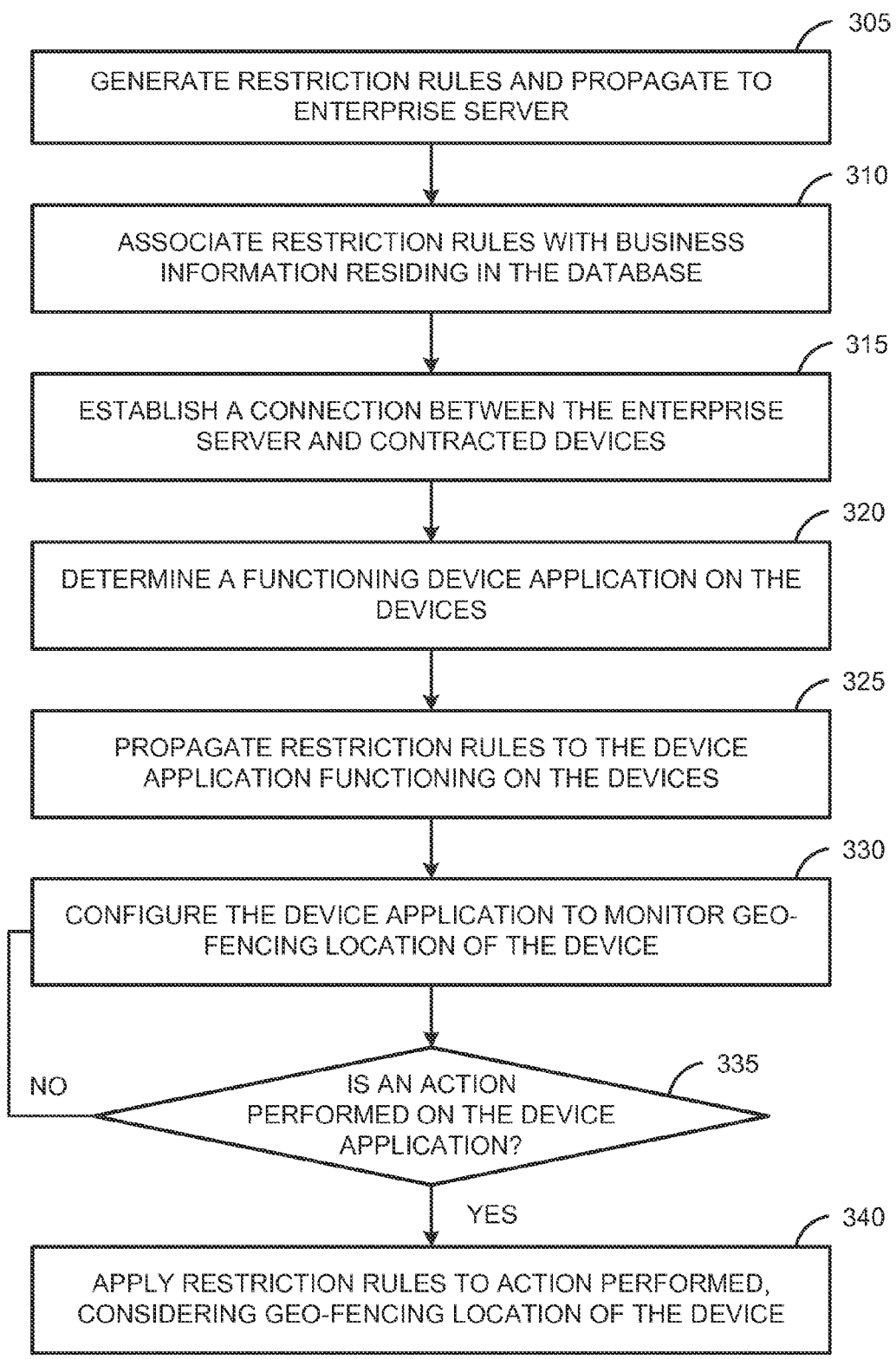
FIG. 3 is a flow diagram illustrating process to provide a secure access to business information, according to an embodiment.

FIG. 3 is a flow diagram illustrating process to provide a secure access to business information, according to an embodiment. Restriction rules are configured to secure access to the business information on devices. These restriction rules may be configured by an administrator of an enterprise server, and the enterprise server orchestrates the restriction rules and the business information. The administrator of the enterprise server may have authorization to define the restriction rules; to describe a manner to secure business information by associating the defined restriction rules to the business information; and to describe sections of the business information that have to be secured. The enterprise server orchestrates the restriction rules and geo-fencing locations. Restriction rules may be generated by defining secure regions including geo-fencing locations and secure geographical areas. Business information associated with the defined secure regions and secure geographical areas may be accessed and viewed from the respective areas. Restriction rules may also be generated by reserving access to the business information from the secure regions. Restriction rules may also be generated by restricting and/or reserving access to partial sections or entire collection of business information. The restriction rules include obscuring the partial sections or the entire collection of the business information when the device is in an unsecure region or in a region that is not designated for accessing or viewing the business information. A policy server generates the restriction rules by defining secure regions. The secure regions may include geo-fencing locations and secure geographical areas.

At 305, the restriction rules are generated and propagated to the enterprise server. In an embodiment, the restriction rules may be provided as an input to the enterprise server. The restriction rules may be propagated from a user interface engine that is in communication with a user interface which is operable to receive user inputs. The business information may be residing in a database associated with the enterprise server.

At 310, the enterprise server associates the restriction rules with the business information residing in the database. The enterprise server may also associate the restriction rules with geo-fencing locations. In an embodiment, orchestrating the restriction rules and the business information includes associating the business information with the corresponding restriction rules based upon the sensitivity of the business information. Orchestrating includes associating the business rules with metadata associated with the business information. This association of the restriction rules with the metadata may be orchestrated at a document level, where the restriction rules may be applied to the entire document. The association may be orchestrated at a document section level, where restriction rules may be applied to one or more sections of the document. For instance, restriction rule ACCESS IN BUILDING A of an enterprise may be associated with a document SALES ORDER of the enterprise. Further, restriction rules VIEW IN LEVEL THREE OF BUILDING A of the enterprise may be associated with CALIFORNIA STATE DETAILS section of the document SALES ORDER of the enterprise. The association of the restriction rules with the business information residing in the database may be persisted in the enterprise server.

At 315, connection between the enterprise server and devices that are contracted to provide secure access to business information is established. The established connection may be between the enterprise server and one device or many devices. Establishing a connection between the enterprise server and the devices includes establishing a connection between the enterprise server and device application functioning on each contracted devices. At 320, this device application functioning on the contracted devices is determined. At 325, the restriction rules persisting in the enterprise server are forwarded to the device application functioning on the devices. In an embodiment, the restriction rules associated with the business information and the geo-locations are extracted by the device application functioning on the devices, from the enterprise server. The enterprise server propagates the restriction rules associated with the business information and the geo-location.

At 330, the device application is configured to monitor the geo-fencing location of the device. The device application functioning on each device monitors the geo-fencing locations based upon a change of position of the corresponding devices. The device application tracks an association of the restriction rules with the geo-fencing locations of the devices. The functioning of the device application at the background of the device may be automated or programmed to start when the device switches on or when the device application is enabled (turned ON). The functioning may be suspended by disabling the device application (turning the application OFF). In an embodiment, based upon the restriction rules, contextual information associated with a current geo-fencing location of the device is rendered. The contextual information may include notification messages about the location, the documents available for downloading and/or viewing at a current location, the documents restricted from downloading and/or viewing at a current location, and the like. Contextual information may also be provided such that when a device enters a secure location, a notification message may be rendered on the device that displays a list of the available downloaded documents for viewing, the available documents for downloading, etc. When the device leaves (exits) from the secure location, a notification message may be rendered that displays inaccessible documents. Based upon the restriction rules, the device application functioning on the device may close the documents that are being viewed, when the device exits from the secure location. The automating of the device application includes displaying contextual information associated with a current location, instead of waiting for a user to initiate/request for such a display. The device application may automatically display a notification when the device enters a secure location; and close the notification when the device exists from the secure location. The automating of the device application may include displaying a message with the business information, based upon the corresponding restriction rules. The automating of the device application includes invoking the device application soon after the device is switched on. The automating of the device application includes scheduling the invoking of the device application on the corresponding device. For instance, at a specified instance e.g. "Monday 08:00 AM" or "1$^{st}$ day of every month", the device application is invoked to function at a background of the device.

The context information rendered may include information and/or details regarding a current geo-fencing location of the device, a listing of available business information that is accessible from the current geo-fencing location, restriction rules associated with the current geo-fencing location, and the like. Contextual information may be automatically rendered on a display screen of the device, without waiting for display instructions from a user of the device. When a device moves out of the geo-fenced location, the device application may disable the rendering of the contextual information, and provide a warning message that the user may no longer be able to access the application and/or any information via the application. When the device moves in to the geo-fenced location, the device application may be restarted, and the rendering of the contextual information may be enabled. In an embodiment, displaying contextual information includes displaying information regarding refreshed data. For instance, a report may be downloaded for viewing at an earlier instance. At the instance of viewing the report, a message that the information in the downloaded report is updated after the report was downloaded, may be provided.

When a user provides the details of the region/location where network connectivity is particularly low, the contextual information displayed may include a warning and a recommendation to download business information ahead of time and ahead of the actual geo-fencing location. The device application enables viewing of this downloaded business information at the geo-fencing location specified in the restriction rules. For instance, an enterprise X may allow its employees to bring their own computing devices to office. While working, an employee may download a business manual of product A onto her device. An administrator of the enterprise server may configure restriction rules such that the downloaded business manual of product A is not available for viewing from outside X office-campus. In an embodiment, specified sections of the downloaded business manual of product A, for e.g., module tutorials section of product A may be available for viewing outside V office-campus; whereas, technical specification section of product A may be restricted from viewing outside X office-campus. Hence, while viewing the downloaded business manual of product A from outside X office-campus, the technical specification section of product A is concealed or made unclear (e.g. blurred, obscured, struck through, shadowed, dimmed, camouflaged etc.), and the module tutorials section is available for viewing. The administrator of the enterprise server may configure restriction rules such that the downloaded business manual of product A may not be viewed (e.g. opened) from outside X office-campus. The administrator of the enterprise server may configure restriction rules such that the entire downloaded business manual of product A may not be viewed (e.g. opened), nor be available as a query result, nor be rendered as available business information in response to a received request, from outside V office-campus.

In an embodiment, rendering access to the downloaded business information includes providing a network connectivity independent access to the downloaded business information, based upon the geo-fencing location of the device that had propagated the request. In continuation to the request to access the business information, the business information may be downloaded at a location where the network connectivity is available. This location, at which the business information is downloaded, may be a secure region, a geo-fenced location, a secure geographical area, an unsecure region, and the like, where a network connectivity is available. However, an access to the downloaded location is provided based upon a current geo-fencing location. Hence, the access to the sensitive/secure business information is independent from the network connectivity, and is based upon the restriction rules and the geo-fencing location of the device.

At decision block 335, it is determined whether an action of requesting access to business information is performed on the device application. If action is performed on the device application, the process proceeds to 340. If no action is performed on the device application, the process loops back to 330. When the request to access business information is executed at 335, restriction rules associated with the action performed are applied at 340, considering the current geo-fencing location of the device.

In an embodiment, based upon the action performed on the device application (or the device), an associated database is queried to determine the requested business information. The determined business information is rendered as a query result when the action is performed in a secure region. In another embodiment, if the device is in an unsecure region, the requested business information is obscured and rendered as the query result. In an embodiment, with an increase in the volume of business information, a default query may be generated to operate in secure regions and secure geographical areas only. The default query may query the database based on restriction rules associated with the secure regions and the secure geographical areas.

In an embodiment, the requested business information is forwarded from the enterprise server to the device. Based upon the current geo-fencing location of the device, the server system may authorize access to the forwarded business information. In an embodiment, authorization of the users to access the business information may require validation of authenticity of the users. For instance, the users may be required to provide a password or a passcode to gain access to the downloaded business information. Upon validating the password/passcode, the users may be authorized to access and/or view business information, partially or entirely for the secure regions.

In an embodiment, the downloading of the business information to the devices in an unsecure region may be permitted. However, the access to such information downloaded in the unsecure region is restricted, and the access becomes permitted when the device moves to a secure region. In an embodiment, access to the downloaded business information may be restricted in a first secure region, and permitted in a second secure region. For example, consider the downloaded business information to be a client-list of enterprise ABC. Consider a first secure region to be a first client MNO from the client-list, and a second secure region to be second client XYZ from the client-list. Enterprise ABC may not want client MNO to view business information of client XYZ, or vice versa. Hence, enterprise ABC may restrict access to downloaded business information of client XYZ from geo-fencing location of client MNO; and permit to the downloaded business information of client XYZ from the client's (XYZ's) own geo-fencing location only.

In an embodiment, access to the business information may be reserved from the secure regions. This includes restricting access to selected sections of the business information from selected geo-fencing location. For instance, a revenue generated from client XYZ may be considered as sensitive section of the business information, and may be restricted when the business information is viewed from client MNO's geo-fencing location. In an embodiment, restricting the access to selected section of the business information may be achieved by obscuring the selected section of the business information. In the above instance, the section of the business information pertaining to the revenue generated from client XYZ may be made unclear (e.g. blurred or obscured), when the business information is accessed from client MNO's geo-fencing location. In an embodiment, propagation or sharing of the business information, in part or in entirety, may be restricted. For instance, consider a sales manager who is responsible for generating revenue from client XYZ and client MNO. The sales manager is restricted from propagating or sharing the business information, in part or in entirety, of one client to another.

In an embodiment, when a sender with device A attempts to send a document DOC1 containing business information (via email) to a receiver with device B, a location of the device A may allow accessing (e.g. downloading and/or viewing, sending, attaching the document DOC1 with the email, etc.) of the business information in the document DOC1. However, a location of the device B may restrict viewing of the business information in the document DOC1. Here, the device application functioning on the device B may generate a notification message indicating the restriction to access the document DOC1. Another notification message may be generated when the device B moves to a secure region, indicating that the document DOC1 is available for downloading and/or viewing. In an embodiment, the email may be accessed and/or viewed; however, to download and/or view the attachment in the email, the device B must be in a secure location. In addition to downloading and viewing, reproducing the business information may be restricted to secure locations. For example, forwarding, editing, sharing, screen-capturing, deleting, printing etc. of the email/attachment is permitted when the device is in a secure location.

Figure 4:
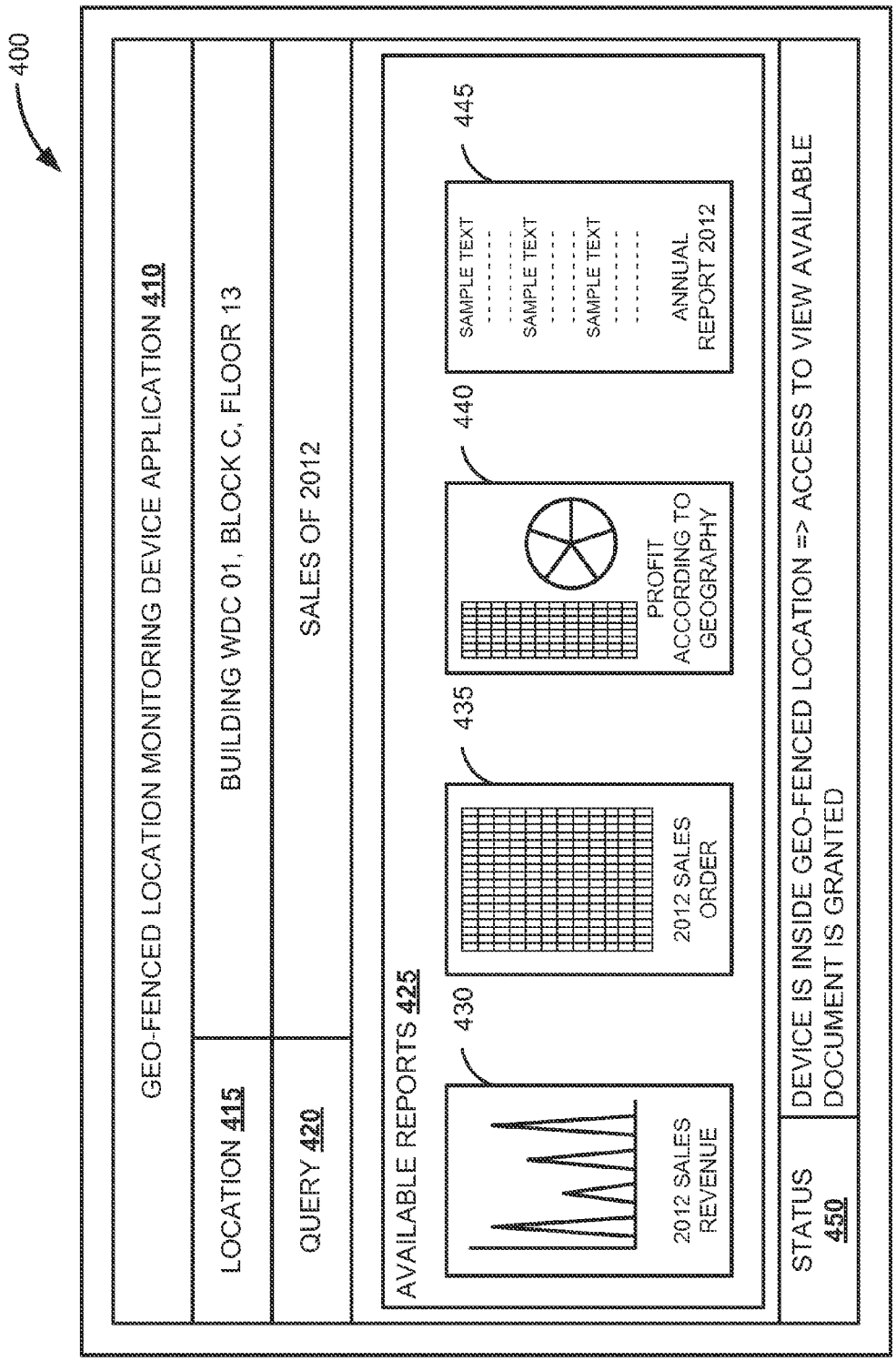
FIG. 4 is a user interface illustrating a provision of secure access to business information, according to an embodiment.

FIG. 4 is a user interface (UI 400) illustrating a provision of secure access to business information, according to an embodiment. To provide a secure access to business information, restriction rules are generated and associated with metadata of the business information. In an embodiment, restriction rule "ALLOW ACCESS TO BUSINESS INFORMATION SALES OF 2012 WHEN GEO-FENCED LOCATION=BUILDING WDC 01, BUILDING WDC 02 and BUILDING WDC 04" is propagated to a device application functioning on a device. Geo-fenced location monitoring device application 410 functions at a background of the associated device, and extracts and/or receives the propagated restriction rules. Device application 410 continually monitors a geo-fencing location of the device based upon the received restriction rules.

UI element 415 represents a current location of the device, for instance, "BUILDING WDC 01, BLOCK C, FLOOR 13". UI element 420 represents a query provided with a (user) request to access business information associated with query "SALES OF 2102". A query is performed based upon the request in UI element 420, to retrieve and render business information in corresponding available reports 425. Based upon the request to access the business information associated with query (e.g. UI element 420), the restriction rules associated with current geo-fencing location of the device (e.g. UI element 415) and the restriction rules associated with the requested business information (e.g. SALES OF 2012) is determined.

As a result of query 420 (SALES OF 2012) performed based upon the request to access the corresponding business information, UI 400 renders: report 430 including graphical representation of 2013 SALES REVENUE; report 435 including tabular representation of 2013 SALES ORDER: report 440 including graphical and tabular representation of PROFIT ACCORDING TO GEOGRAPHY; and report 445 including textual information in ANNUAL REPORT 2013. Based upon the restriction rules associated with the requested business information and network connectivity, the requested business information is downloaded to the device. In an embodiment, the business information to be downloaded may be selected from available reports in UI element 425.

Based upon the current geo-fencing location of the device (e.g. determined at UI element 415) "BUILDING WDC 01, BLOCK C, FLOOR 13", an access to the downloaded business information is rendered, as "BUILDING WDC 01, BLOCK C, FLOOR 13", is included in the propagated restriction rule "ALLOW ACCESS TO BUSINESS INFORMATION SALES OF 2012 WHEN GEO-FENCED LOCATION=BUILDING WDC 01. BUILDING WDC 02 and BUILDING WDC 04".

In an embodiment, the status of the access to the requested business information is rendered on U element 450. For instance, UI element 450 renders: "DEVICE IS INSIDE GEO-FENCED LOCATION→ACCESS TO VIEW AVAILABLE DOCUMENT IS GRANTED". Since rendered available reports 425 includes report 430, report 435, report 440 and report 445, any one or all the reports rendered may be accessed, downloaded and viewed.

Figure 5:
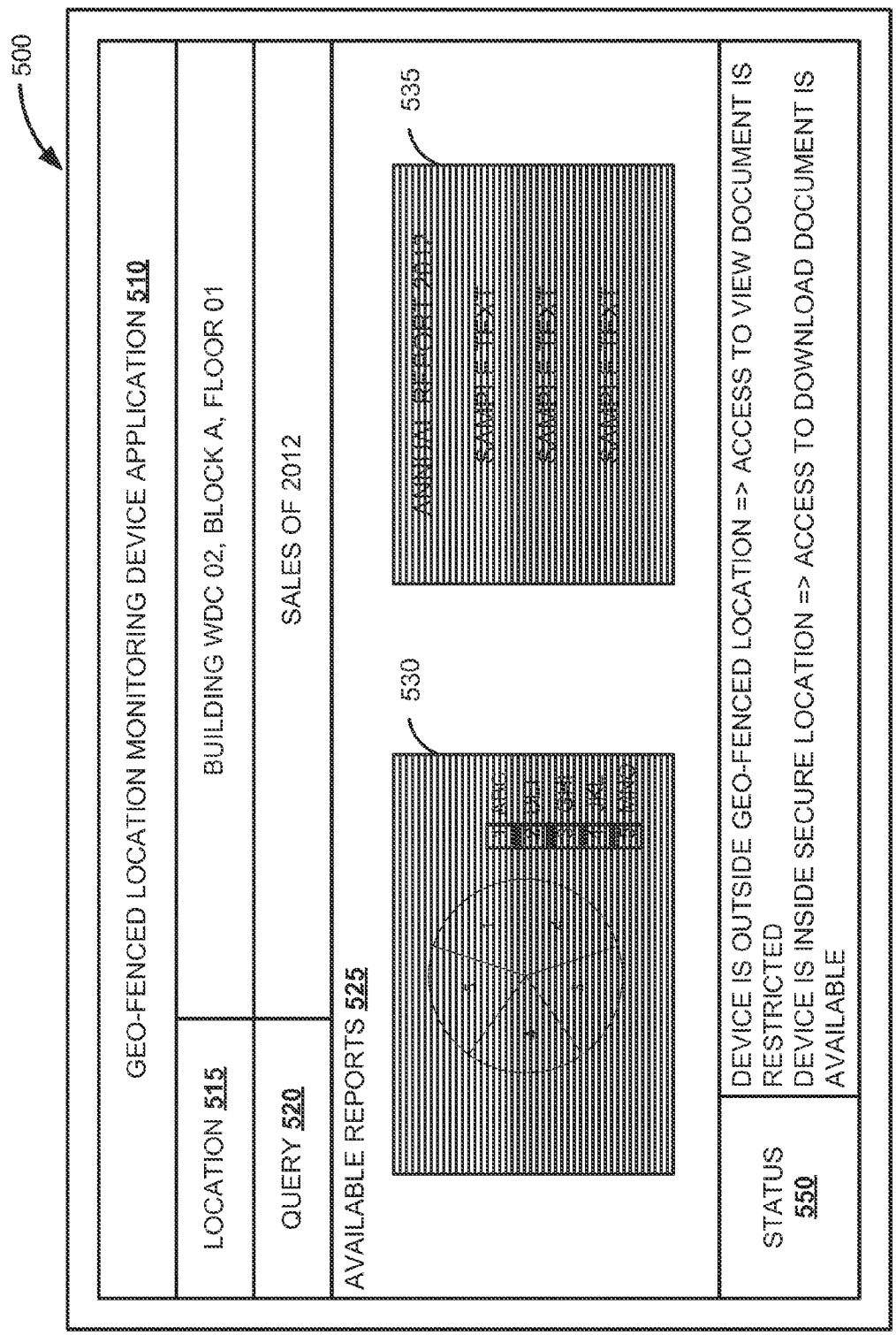
FIG. 5 is a user interface illustrating a provision of secure access to business information, according to an embodiment.

FIG. 5 is a user interface (UI 500) illustrating a provision of secure access to business information, according to an embodiment. To provide a secure access to business information, restriction rules are generated and associated with metadata of the business information. In an embodiment, three restriction rules including restriction rule 1 "ALLOW ACCESS TO BUSINESS INFORMATION SALES OF 2012 WHEN GEO-FENCED LOCATION=BUILDING WDC 01"; restriction rule 2 "SECURE REGION=BUILDING WDC 01. BUILDING WDC 02"; and restriction rule 3 "UNSECURE REGION=BUILDING WDC WAREHOUSE" are propagated to a device application functioning on a device. Geo-fenced location monitoring device application 510 functions at a background of the associated device, and extracts and/or receives the propagated restriction rules. Device application 510 continually monitors a geo-fencing location of the device based upon the received restriction rules.

UI element 515 represents a current location of the device, for instance, "BUILDING WDC 02, BLOCK A, FLOOR 01". UI element 520 represents a query provided with a (user) request to access business information associated with query SALES OF 2012. A query is performed based upon the request in UI element 520, to retrieve and render business information in corresponding available reports 525. Based upon the request to access the business information associated with query (e.g. UI element 520), the restriction rules associated with current geo-fencing location of the device (e.g. UI element 515) and the restriction rules associated with the requested business information (e.g. SALES OF 2012) is determined.

As a result of query 520 (SALES OF 2012) performed based upon the request to access the corresponding business information, UI 500 renders: report 530 including graphical representation of 2012 SALES REVENUE and report 535 including textual information in ANNUAL REPORT 2012. Based upon the restriction rules associated with the requested business information and network connectivity, the requested business information is downloaded to the device. In an embodiment, the business information to be downloaded may be selected from available reports in UI element 525.

Based upon the current geo-fencing location of the device (e.g. determined at UI element 515) "BUILDING WDC 02, BLOCK A, FLOOR 01", an access to the downloaded business information is rendered, as BUILDING WDC 02, BLOCK A, FLOOR 01, is included in the propagated restriction rule 2 as "SECURE REGION=BUILDING WDC 01, BUILDING WDC 02". However, according to restriction rule 1 "ALLOW ACCESS TO BUSINESS INFORMATION SALES OF 2012 WHEN GEO-FENCED LOCATION=BUILDING WDC 01". Hence, viewing of available reports 525 is restricted. The restriction of viewing of available reports 525 is indicated by obscuring of reports 530 and 535.

The status of the access to the requested business information is rendered on UI element 550. For instance, UI element 550 renders: "DEVICE IS OUTSIDE GEO-FENCED LOCATION→ACCESS TO VIEW DOCUMENT IS RESTRICTED"; and "DEVICE IS INSIDE SECURE LOCATION→ACCESS TO DOWNLOAD DOCUMENT IS AVAILABLE". Although reports 530 and 535 are downloaded at a different, viewing of the downloaded reports 530 and 535 is available only when the device is in location WDC 01 (according to restriction rule 1).

Figure 6:
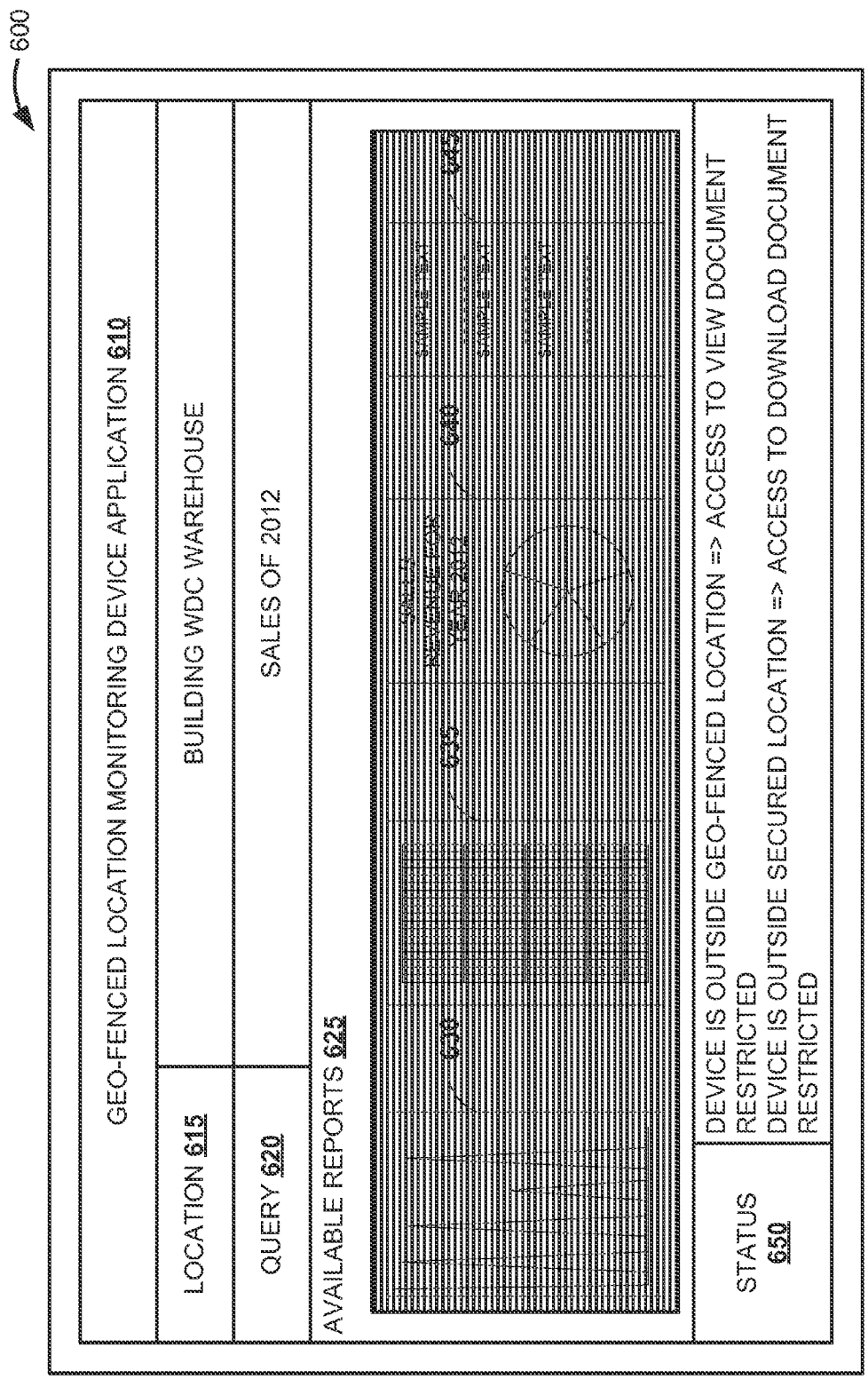
FIG. 6 is a user interface illustrating a provision of secure access to business information, according to an embodiment.

FIG. 6 is a user interface (UI 600) illustrating a provision of secure access to business information, according to an embodiment. To provide a secure access to business information, restriction rules are generated and associated with metadata of the business information. In an embodiment, three restriction rules including restriction rule 1 "ALLOW ACCESS TO BUSINESS INFORMATION SALES OF 2012 WHEN GEO-FENCED LOCATION=BUILDING WDC 01"; restriction rule 2 "SECURE REGION=BUILDING WDC 01, BUILDING WDC 02"; and restriction rule 3 "UNSECURE REGION=BUILDING WDC WAREHOUSE" are propagated to a device application functioning on a device. Geo-fenced location monitoring device application 610 functions at a background of the associated device, and extracts and/or receives the propagated restriction rules. Device application 610 continually monitors a geo-fencing location of the device based upon the received restriction rules.

UI element 615 represents a current location of the device, for instance. BUILDING WDC WAREHOUSE. UI element 620 represents a query provided with a (user) request to access business information associated with query SALES OF 2012. A query is performed based upon the request in UI element 620, to retrieve and render business information in corresponding available reports 625. Based upon the request to access the business information associated with query (e.g. UI element 620), the restriction rules associated with current geo-fencing location of the device (e.g. UI element 615) and the restriction rules associated with the requested business information (e.g. SALES OF 2012) is determined.

As a result of query 620 (SALES OF 2012) performed based upon the request to access the corresponding business information, UI 600 renders: report 630, report 635, report 640 and report 645. However, since the device is currently in an unsecure region according to restriction rule 3, available reports 625 are obscured. The status of the access to the requested business information is rendered on UI element 650. For instance, UI element 650 renders: "DEVICE IS OUTSIDE GEO-FENCED LOCATION→ACCESS TO VIEW DOCUMENT RESTRICTED" and "DEVICE IS OUTSIDE SECURED LOCATION→ACCESS TO DOWNLOAD DOCUMENT RESTRICTED". Since the device is in an unsecure region, downloading and viewing of business information is restricted.

FIG. 7 is a user interface (UI 700) illustrating a provision of secure access to business information, according to an embodiment. To provide a secure access to business information, restriction rules are generated and associated with metadata of the business information. In an embodiment, restriction rule "ALLOW ACCESS TO BUSINESS INFORMATION SALES OF 2012 WHEN GEO-FENCED LOCATION=BUILDING WDC 01, BUILDING WDC 02 and BUILDING WDC 04" is propagated to a device application persisting or functioning on a device. Geo-fenced location monitoring device application 710 functions at a background of the associated device, and extracts and/or receives the propagated restriction rules. Device application 710 continually monitors a geo-fencing location of the device based upon the received restriction rules.

UI element 715 represents a current location of the device, for instance, "BUILDING WDC 01, BLOCK C, FLOOR 13". UI element 720 represents a query provided with a (user) request to access business information associated with query SALES OF 2012. A query is performed based upon the request in UI element 720, to retrieve and render business information in corresponding available reports 725. Based upon the request to access the business information associated with query (e.g. UI element 720), the restriction rules associated with current geo-fencing location of the device (e.g. UI element 715) and the restriction rules associated with the requested business information (e.g. SALES OF 2012) is determined.

As a result of query 720 (SALES OF 2012) performed based upon the request to access the corresponding business information, UI 700 renders available reports. Based upon the restriction rules associated with the requested business information and network connectivity, the requested business information is downloaded to the device. In an embodiment, the business information to be downloaded may be selected from available reports in UI element 725. Selected report 754 is rendered for viewing.

Based upon the current geo-fencing location of the device (e.g. determined at UI element 715) "BUILDING WDC 01, BLOCK C, FLOOR 13", an access to view the downloaded business information is rendered, as BUILDING WDC 01, BLOCK C, FLOOR 13, is included in the propagated restriction rule "ALLOW ACCESS TO BUSINESS INFORMATION SALES OF 2012 WHEN GEO-FENCED LOCATION=BUILDING WDC 01, BUILDING WDC 02 and BUILDING WDC 04". In an embodiment, the status of the access to the requested business information is rendered on UI element 750. For instance, UI element 750 renders: "DEVICE IS INSIDE GEO-FENCED LOCATION→ACCESS TO VIEW DOCUMENT IS GRANTED→DOCUMENT VIEW RENDERED".

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 8:
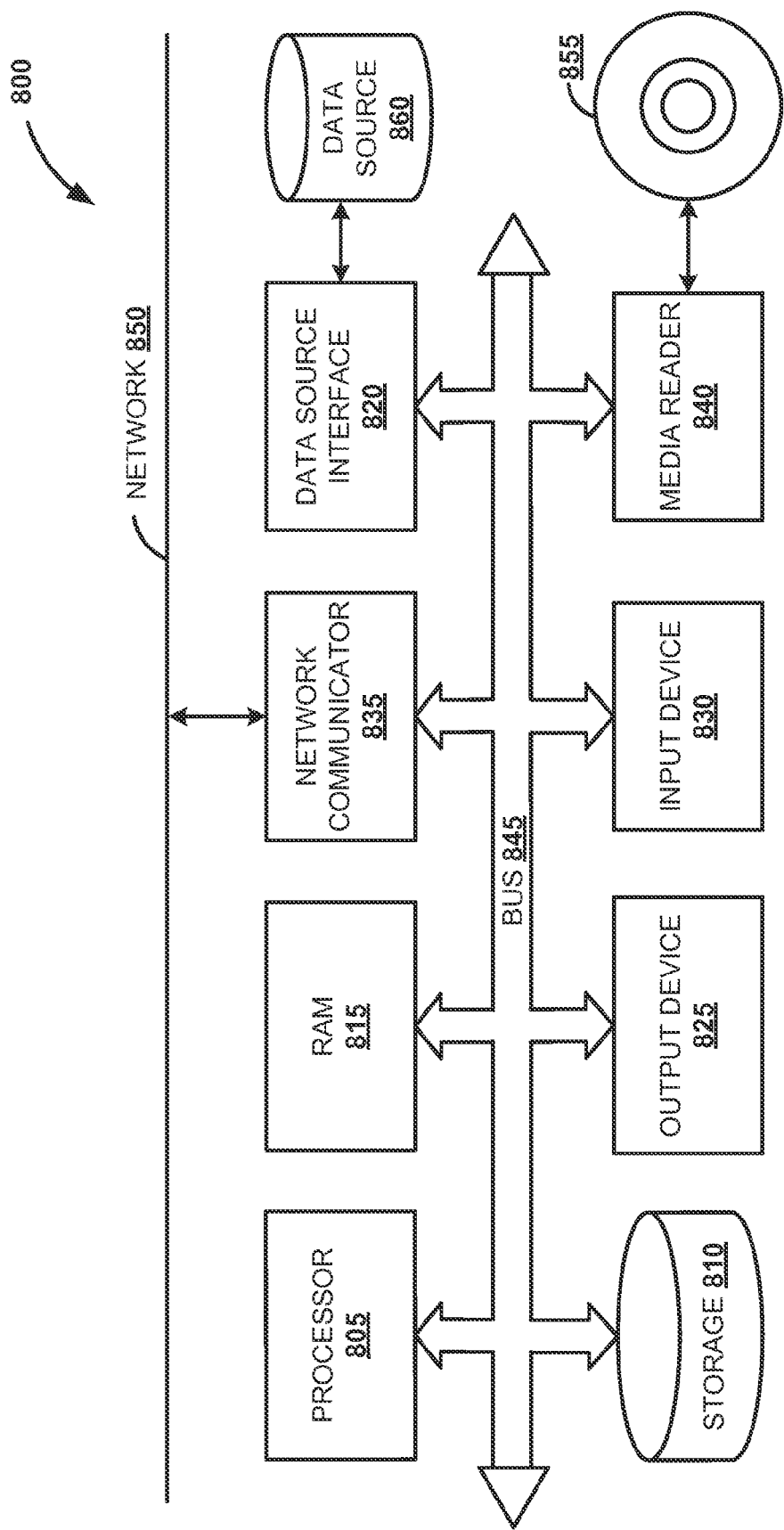
FIG. 8 is a block diagram illustrating an exemplary computer system, according to an embodiment.

FIG. 8 is a block diagram of an exemplary computer system 800, according to an embodiment. The computer system 800 includes a processor 805 that executes software instructions or code stored on a computer readable storage medium 855 to perform the above-illustrated methods. The processor 805 can include a plurality of cores. The computer system 800 includes a media reader 840 to read the instructions from the computer readable storage medium 855 and store the instructions in storage 810 or in random access memory (RAM) 815. The storage 810 provides a large space for keeping static data where at least some instructions could be stored for later execution. According to some embodiments, such as some in-memory computing system embodiments, the RAM 815 can have sufficient storage capacity to store much of the data required for processing in the RAM 815 instead of in the storage 810. In some embodiments, all of the data required for processing may be stored in the RAM 815. The stored instructions may be further compiled to generate other representations of the instructions and dynamically stored in the RAM 815. The processor 805 reads instructions from the RAM 815 and performs actions as instructed. According to one embodiment, the computer system 800 further includes an output device 825 (e.g., a display) to provide at least some of the results of the execution as output including, but not limited to, visual information to users and an input device 830 to provide a user or another device with means for entering data and/or otherwise interact with the computer system 800. Each of these output devices 825 and input devices 830 could be joined by one or more additional peripherals to further expand the capabilities of the computer system 800. A network communicator 835 may be provided to connect the computer system 800 to a network 850 and in turn to other devices connected to the network 850 including other clients, servers, data stores, and interfaces, for instance. The modules of the computer system 800 are interconnected via a bus 845. Computer system 800 includes a data source interface 820 to access data source 860. The data source 860 can be accessed via one or more abstraction layers implemented in hardware or software. For example, the data source 860 may be accessed by network 850. In some embodiments the data source 860 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments and examples are described herein for illustrative purposes, various equivalent modifications are possible within the scope, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method of providing a secure access to business information comprising:
    receiving restriction rules at a device application functioning in a device, wherein the restriction rules are configured based on content and context of the business information associated with a section of a document, and the restriction rules are associated with metadata of the business information;
    based upon a request to access the business information triggered at the device, determining one or more restriction rules associated with a current geo-fencing location of the device from the received restriction rules and one or more restriction rules associated with the requested business information from the received restriction rules, wherein the current geo-fencing location of the device is monitored by the device application;
    based upon the one or more restriction rules associated with the requested business information and based upon network connectivity, downloading the requested business information to the device; and
    based upon the one or more restriction rules associated with the current geo-fencing location of the device and independency of the network connectivity:
        providing access to the downloaded business information at a secure geo-fencing location; and
        restricting access to the downloaded business information at an unsecure geo-fencing location by closing a display of the downloaded business information.

2. The computer implemented method of claim 1, wherein downloading the business information comprises establishing a connection between a server system and the device.

3. The computer implemented method of claim 2 further comprising: generating the one or more restriction rules by:
    defining one or more secure regions, the secure regions including one or more geo-fencing locations and one or more secure geographical areas;
    reserving at least partial access to the business information from the one or more secure regions; and
    restricting at least partial access to share the business information.

4. The computer implemented method of claim 3, wherein restricting access comprises:
    restricting access to the downloaded business information from a first secure region; and
    permitting access to the downloaded business information when the device moves to a second secure region from the first secure region.

5. The computer implemented method of claim 3, wherein reserving access includes:
    restricting the access to one or more sections of the business information from the one or more secure regions by obscuring the one or more sections of the business information in the one or more secure regions;
    upon validation, authorizing one or more users to access the one or more sections of the business information from the one or more secure regions; and
    restricting a propagation of, at least in part, the one or more sections of the business information.

6. The computer implemented method of claim 1 further comprising:
    rendering the downloaded business information when the device is in a secure region; and
    obscuring the business information when the device is in an unsecure region.

7. The computer implemented method of claim 1 further comprising:
    permitting access to the downloaded business information when the device moves to a secure region from an unsecure region.

8. The computer implemented method of claim 1, wherein the one or more received restriction rules are associated with the metadata of the business information, associating comprises:
  defining one or more unique identifiers corresponding to the one or more restriction rules;
  associating the unique identifiers with metadata of at least the section of the document containing the business information; and
  associating the unique identifiers with one or more geo-fencing locations.

9. The computer implemented method of claim 1, wherein receiving the restriction rules on the device application comprises: extracting, by the device, the restriction rules associated with the business information and the geo-fencing location corresponding to the restriction rules from a server system.

10. The computer implemented method of claim 1, wherein receiving the restriction rules on the device application comprises: propagating, by a server system, the restriction rules associated with the business information and the geo-fencing location to the device application functioning in the device.

11. The computer implemented method of claim 1, wherein the device application persisting in the device executes operations comprising:
  detecting one or more geo-fencing locations based upon a change of position of the device; and
  tracking an association of the one or more restriction rules to the one or more geo-fencing locations of the device.

12. The computer implemented method of claim 1 further comprising:
  automating a functioning of the device application at a background of the device; and
  based upon the restriction rules, rendering a contextual information associated with the current geo-fencing location of the device.

13. The computer implemented method of claim 1 further comprising:
  querying an associated database to determine the requested business information;
  rendering the requested business information as a query result in one or more secure regions; and
  obscuring requested business information as the query result in one or more unsecure regions.

14. A computer system to provide a secure access to business information comprising:
  a processor configured to read and execute instructions stored in one or more memory elements; and
  the one or more memory elements storing instructions related to—
    a server system to
      associate one or more received restriction rules with metadata of the business information, wherein the restriction rules are configured based on content and context of the business information associated with a section of a document; and
      forward the restriction rules to a device application functioning in a device; and
    the device application functioning in the device to
      monitor a current geo-fencing location of the device based upon the received restriction rules;
      trigger a request to access the business information at the device;
      determine the one or more restriction rules associated with the current geo-fencing location of the device from the received restriction rules and the one or more restriction rules associated with the requested business information from the received restriction rules;
      download the requested business information to the device based upon the one or more restriction rules associated with the requested business information and based upon network connectivity; and
      provide access to the downloaded business information at a secure geo-fencing location and restrict access to the downloaded business information at an unsecure geo-fencing location, by closing a display of the downloaded business information, based upon the one or more restriction rules associated with the current geo-fencing location of the device and independency of the network connectivity.

15. The computer system of claim 14 further comprising:
  a policy server to generate the one or more restriction rules by
    defining one or more secure regions, the secure regions including one or more geo-fencing locations and one or more secure geographical areas:
      reserving at least partial access to the business information from the one or more secure regions; and
      restricting at least partial access to share the business information.

16. The computer system of claim 15 further comprising a database associated with the server system stores the generated one or more restriction rules.

17. The computer system of claim 14 further comprising a user interface engine renders the downloaded business information on an associated computer generated user interface.

18. An article of manufacture including a non-transitory computer readable storage medium to tangibly store instructions, which when executed by a computer, cause the computer to:
  receive restriction rules on a device application functioning in a device, wherein the restriction rules are configured based on content and context of business information associated with a section of a document, and the restriction rules are associated with metadata of the business information;
  based upon a request to access the business information triggered at the device, determine one or more restriction rules associated with a current geo-fencing location of the device from the received restriction rules and one or more restriction rules associated with the requested business information from the received restriction rules, wherein the current geo-fencing location of the device is monitored by the device application;
  based upon the one or more restriction rules associated with the requested business information and based upon network connectivity, download the requested business information to the device; and
  based upon the one or more restriction rules associated with the current geo-fencing location of the device and independency of the network connectivity;
    provide access to the requested business information at a secure geo-fencing location; and
    restrict access to the downloaded business information at an unsecure geo-fencing location by closing a display of the downloaded business information.

19. The article of manufacture of claim 18, wherein downloading the business information comprises establishing a connection between a server system and the device.

* * * * *